(12) United States Patent
Smith (10) Patent No.: US 7,544,125 B2
(45) Date of Patent: *Jun. 9, 2009

(54) SYSTEM AND METHOD FOR DETECTING A CONDITION INDICATIVE OF PLUGGING OF A DISCHARGE PATH OF AN AGRICULTURAL COMBINE

(75) Inventor: Dwayne B. Smith, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/879,263

(22) Filed: Jul. 17, 2007

(65) Prior Publication Data
US 2007/0270200 A1 Nov. 22, 2007

Related U.S. Application Data

(62) Division of application No. 11/118,058, filed on Apr. 29, 2005, now Pat. No. 7,381,130.

(51) Int. Cl.
*A01D 75/18* (2006.01)
(52) U.S. Cl. .............................. 460/6; 460/1; 56/10.2 R
(58) Field of Classification Search .............. 56/10.2 R; 460/1, 4–7, 99, 100, 115, 119
See application file for complete search history.

(56) References Cited

U.S. PATENT DOCUMENTS

| | | | |
|---|---|---|---|
| 3,515,144 A | 6/1970 | Morrison | 460/4 |
| 3,626,402 A | 12/1971 | Price | 340/521 |
| 3,863,428 A | 2/1975 | Baxter | 56/10.2 R |
| 4,072,934 A | 2/1978 | Hiller et al. | 340/608 |
| 4,176,617 A | 12/1979 | Pilipski | 116/70 |
| 4,230,130 A | 10/1980 | Staiert | 460/5 |
| 4,259,829 A * | 4/1981 | Strubbe | 460/5 |
| 4,286,424 A | 9/1981 | Hubbard | 56/10.2 R |
| 4,360,998 A | 11/1982 | Somes | 460/5 |
| 4,481,756 A | 11/1984 | Schartz | 460/5 |
| 4,589,425 A | 5/1986 | Mitchell, Jr. | 460/90 |
| 4,635,047 A | 1/1987 | Fox et al. | 340/684 |
| 4,751,501 A | 6/1988 | Gut | 340/607 |
| 5,015,997 A | 5/1991 | Strubbe | 340/684 |
| 5,063,729 A | 11/1991 | Fox et al. | 56/30 |
| 5,232,405 A * | 8/1993 | Redekop et al. | 460/112 |
| 5,425,223 A | 6/1995 | DeLaRonde | 56/10.2 R |
| 5,569,081 A | 10/1996 | Baumgarten et al. | 460/112 |
| 5,604,306 A | 2/1997 | Schricker | 73/118.2 |
| 5,819,512 A | 10/1998 | Steffen et al. | 56/10.2 R |
| 5,855,108 A | 1/1999 | Salz et al. | 56/10.2 G |
| 5,871,397 A | 2/1999 | Nelson et al. | 460/7 |
| 5,923,262 A | 7/1999 | Fuss et al. | 340/684 |
| 5,957,773 A | 9/1999 | Olmsted et al. | 460/7 |
| 6,119,442 A | 9/2000 | Hale | 56/10.2 H |

(Continued)

*Primary Examiner*—Alicia M Torres
(74) *Attorney, Agent, or Firm*—Michael G. Harms; JohnWilliam Stader; Patrick M. Sheldrake (57) ABSTRACT

A system and method for detecting a condition indicative of onset of plugging or actual plugging of a discharge of an agricultural combine, utilizing a pressure sensor disposed at a location within the combine spaced from the discharge and operable for sensing an air pressure condition relating to a flow indicative of a reduced crop residue flow condition toward or in the discharge.

1 Claim, 5 Drawing Sheets

U.S. PATENT DOCUMENTS

| | | | |
|---|---|---|---|
| 6,483,583 B1 | 11/2002 | Wright et al. | 356/326 |
| 6,524,183 B1 * | 2/2003 | Van Quekelberghe | 460/4 |
| 6,526,120 B1 | 2/2003 | Gray et al. | 378/57 |
| 6,546,705 B2 | 4/2003 | Scarlett et al. | 56/10.2 R |
| 6,584,390 B2 | 6/2003 | Beck | 701/50 |
| 6,591,145 B1 | 7/2003 | Hoskinson et al. | 700/8 |
| 6,650,975 B2 | 11/2003 | Ruffner | 701/23 |
| 6,726,559 B2 | 4/2004 | Bischoff | 460/1 |
| 2003/0190939 A1 | 10/2003 | Bueermann | 460/111 |
| 2004/0041710 A1 | 3/2004 | Kwon | 340/607 |

* cited by examiner

SYSTEM AND METHOD FOR DETECTING A CONDITION INDICATIVE OF PLUGGING OF A DISCHARGE PATH OF AN AGRICULTURAL COMBINE

This divisional application claims priority under 35 U. S. C. § 120 from co-pending U.S. patent application Ser. No. 11/118,058 filed on Apr. 29, 2005 now U.S. Pat. No. 7,381, 130 by Dwayne B. Smith with the same title, the full disclosure of which is hereby incorporated by reference.

TECHNICAL FIELD

The present invention relates generally to a system and method for detecting a condition indicative of plugging of a path for discharging crop residue from an agricultural combine, and more particularly, for detecting a condition indicative of the onset of plugging, to allow avoiding occurrence of actual plugging and the requirement of removing the plug.

BACKGROUND ART

Agricultural combines are well known in the art for harvesting and threshing various agricultural crops, including for example, wheat, soybeans, corn, etc. Usually, agricultural combines include a harvesting apparatus, an infeed mechanism, a separating apparatus and a cleaning apparatus. In operation, the harvesting apparatus reaps the crop, which is planted in the ground. After reaping, the infeed mechanism feeds the crop to the separating apparatus.

Typically, the separating apparatus in a rotary combine includes at least one rotor, which can extend axially (front to rear) or transversely within the body of the combine, and which is surrounded at least in part by a perforated concave having a plurality of apertures. The grain is threshed and separated by the separating apparatus, and the separated grain, together with some impurities, such as chaff, dust, and crop residue particles, are fed to a cleaning system to clean the impurities from the grain. Clean grain is collected below the cleaning system and fed to a grain tank for temporary storage. The clean grain, impurities and smaller elements and particles of the crop residue are separated form the bulk of the crop residue by the separating apparatus and the resulting residue is delivered for processing by a discharge delivery system While the terms "grain" and "crop residue" are used principally throughout this specification for convenience, it should be understood that these terms are not intended to be limiting. Thus "grain" refers to that part of the crop which is threshed and separated from the discardable part of the crop material ( e g. straw), which is referred to as "crop residue".

Traditional discharge delivery systems rely on a device often referred to as a "straw walker" or another device known as a "discharge beater", to transport or convey the separated crop residue rearwardly within a body of the combine to a residue handling system. Generally, straw walkers, which involve crank mechanisms for conveying the crop residue rearwardly through a combine, are relatively slow in operation and thus have a limited material handling capability or rate. The crank mechanisms add complexity and vibration. Discharge beaters "throw" or propel the crop residue away from the separator and toward the rear of the combine. In both instances, the crop residue can be discharged directly in its raw form through a rear opening of the combine onto the harvested field; it can be directed into a chopper mechanism in connection with the rear of the combine which chops the crop residue and then discharges it onto the harvested field; or the chopper can function just as a spreader for spreading the unchopped crop residue onto the field.

Today' s new, improved combines have greater harvesting and threshing capacities. Although discharge systems such as briefly discussed above have also improved, the harvesting and threshing systems of modern combines can at times produce volumes of crop residue material that can exceed the capacity of the discharge systems, leading to plugging thereof and packing of crop residue thereagainst and over the cleaning system, which can require substantial down time and effort to remove. In some instances, the only warning of plugging is when an operator notices that crop residue is no longer being discharged or is being discharged at a rate which appears to be too low or the pattern of discharge is incorrect. Therefore, it would be advantageous if accurate early warning or information indicative of a plugging condition, or onset of a plugging condition, were provided, to allow an operator or automatic control to take steps to avoid plugging, or shut down the machine for removing the plug and/or cleaning, before significant down time and effort is required to do so.

As an additional problem, if crop residue falls short of the rear of the combine, blockages and interference with and reduction in the effectiveness in the operation of the chaff handling system of the combine can occur, thereby also resulting in combine down time, decreases in harvesting productivity, and increases in operator and owner dissatisfaction and component failure. Therefore, it would be advantageous to avoid this problem also.

Accordingly, what is sought is a system or method for detecting a plugging of a crop residue discharge of a combine which provides one or more advantages, and overcomes one or more problems, set forth above.

SUMMARY OF THE INVENTION

With this invention, a system and method for detecting a condition indicative of onset of plugging or actual plugging of a discharge of an agricultural combine, which provides one or more of the advantages, and overcomes one or more problems, set forth above, is disclosed.

According to a preferred aspect of the invention the combine includes a body defining a space containing a separating apparatus or system, and a rear opening spaced rearwardly of the separating system. A rotary beater or other propeller device is disposed in the space between the separating system and the rear opening and operable for propelling a flow of crop residue rearwardly along a crop flow path from the separating system toward a rear end of the space. The combine includes a cleaning system disposed in the space below the rotary beater and including a fan disposed for directing a flow of air rearwardly through an air flow channel through the space between the cleaning system and the beater, and an air pressure sensor is disposed in the space so as to be operable for sensing an air pressure condition therein indicative of a reduced crop residue flow condition toward the rear end of the space.

This location is advantageous, as it locates the air pressure sensor out of the actual crop residue flow, and away from an actual plugging condition. Instead, the invention utilizes detected changes or variations in air pressure conditions at the location remote from the actual plugging condition, to enable determining the presence of conditions indicative of the onset of plugging and/or actual plugging, such that the detector, here, an air pressure sensor, is not subjected to adverse conditions of plugging, such as, but not limited to, being clogged or plugged with crop material, dust, or the like. Here, it should be recognized and understood also that pressure conditions at the location of the sensor can be affected by changing parameters, which can include ambient air conditions and moisture content and consistency of the crop residue, as well as different discharge apparatus set ups, for instance, a set up for directing crop residue into a chopper for chopping thereby; a set up for just spreading the crop residue; a set up for windrowing; and/or a set up for mixing chaff with the crop residue, and aspects of the system of the invention can be adapted for factoring such variables when determining the existence or non-existence of a plugging condition. Additionally, the criticality of plugging under a particular discharge set up can be a factor. For instance, if windrowing, the clearing of a plug may not be as difficult and/or time consuming, compared to if the inlet of a chopper is plugged, and the system can be adjusted or calibrated to output a warning or make adjustments accordingly. For instance, when windrowing, a warning of a plugging condition may be outputted at a later time compared to if chopping crop residue. According to another preferred aspect of the invention, the combine includes a pan or concave disposed in the space beneath the beater and above the air flow channel, for guiding the crop residue flow propelled by the beater, and the air pressure sensor is preferably disposed below the concave. The cleaning system can further include a generally flat, horizontal sieve disposed below the air flow channel, and the air pressure sensor is preferably disposed above the sieve. This location, below the concave and above the cleaning system sieve, places the sensor in a flow channel for air from a fan of the cleaning system, and it has been found that air pressure conditions at this location are good indicators of the onset and existence of plugging conditions more rearwardly in the discharge area of the combine.

According to still another preferred aspect of the invention, a crop residue chopper is disposed in connection with the rear opening, and a conveyor mechanism is disposed in a rear region of the space in a position for receiving at least a portion of the flow of the crop residue from the beater and conveying the received flow into the chopper, the air pressure sensor being operable for sensing an air pressure condition indicative of plugging involving the conveyor mechanism According to still another preferred aspect of the invention, the combine includes a control in connection with the air pressure sensor, and a device for determining a speed of the conveyor mechanism, and the control is operable for determining existence of onset of or an actual plugging condition involving the conveyor as a function of conveyor speed. The control can also be operable for determining a new speed for the conveyor mechanism as a function at least in part of a sensed air pressure and determined speed of the conveyor. In another preferred aspect, the combine includes a device for determining a speed of rotation of the beater, and a device for determining a speed of the fan, and the control is operable for existence of onset of or an actual plugging condition as a function at least in part of a sensed air pressure and a determined speed.

BRIEF DESCRIPTION OF THE DRAWINGS

These and other advantages of the present invention are best understood with reference to the drawings, in which.

DETAILED DESCRIPTION OF THE INVENTION

Figure 1:
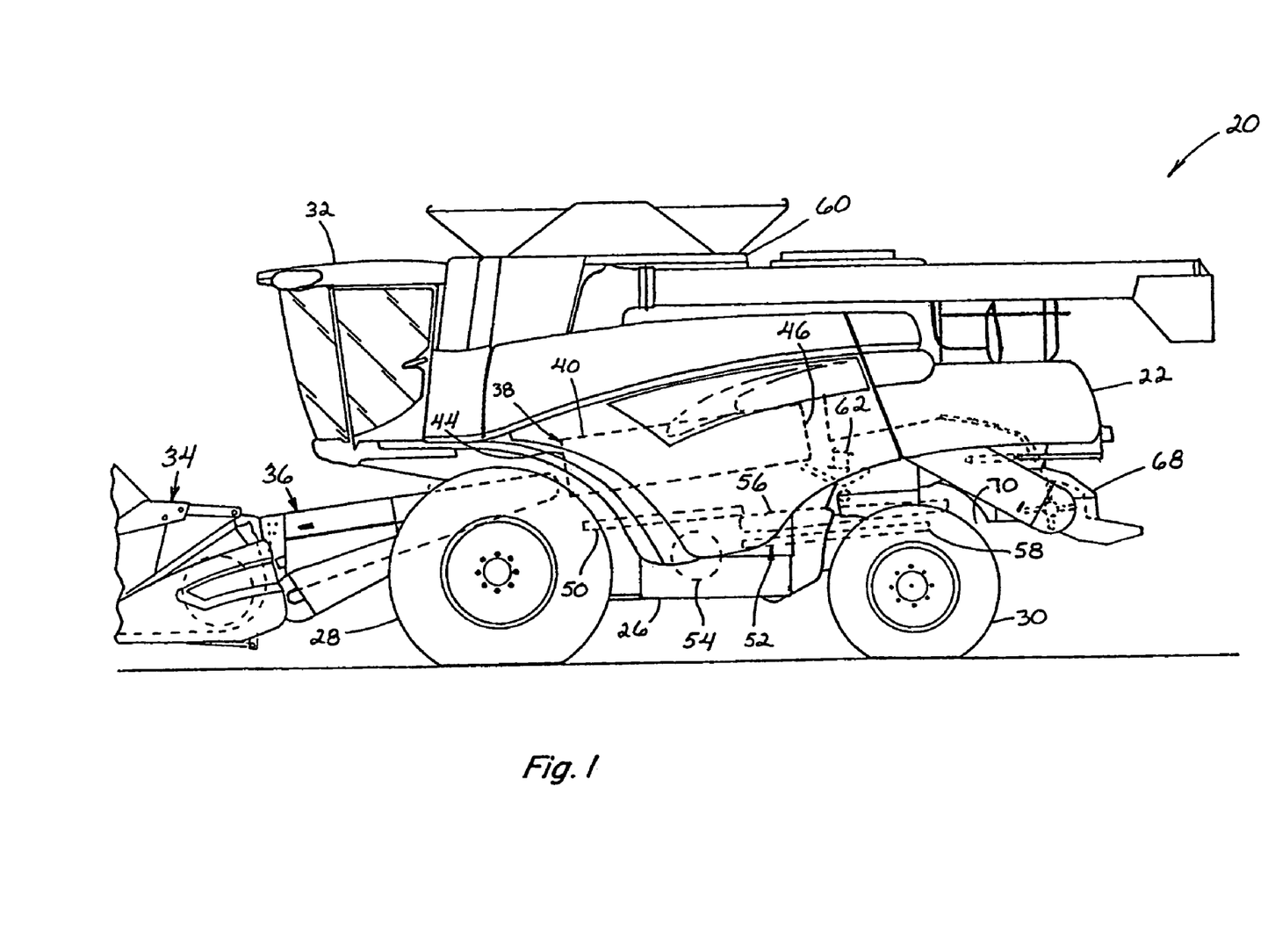
FIG. 1 is a side view of an agricultural combine including a system according to the invention for detecting plugging of a discharge of the combine.
Figures 2, 4:
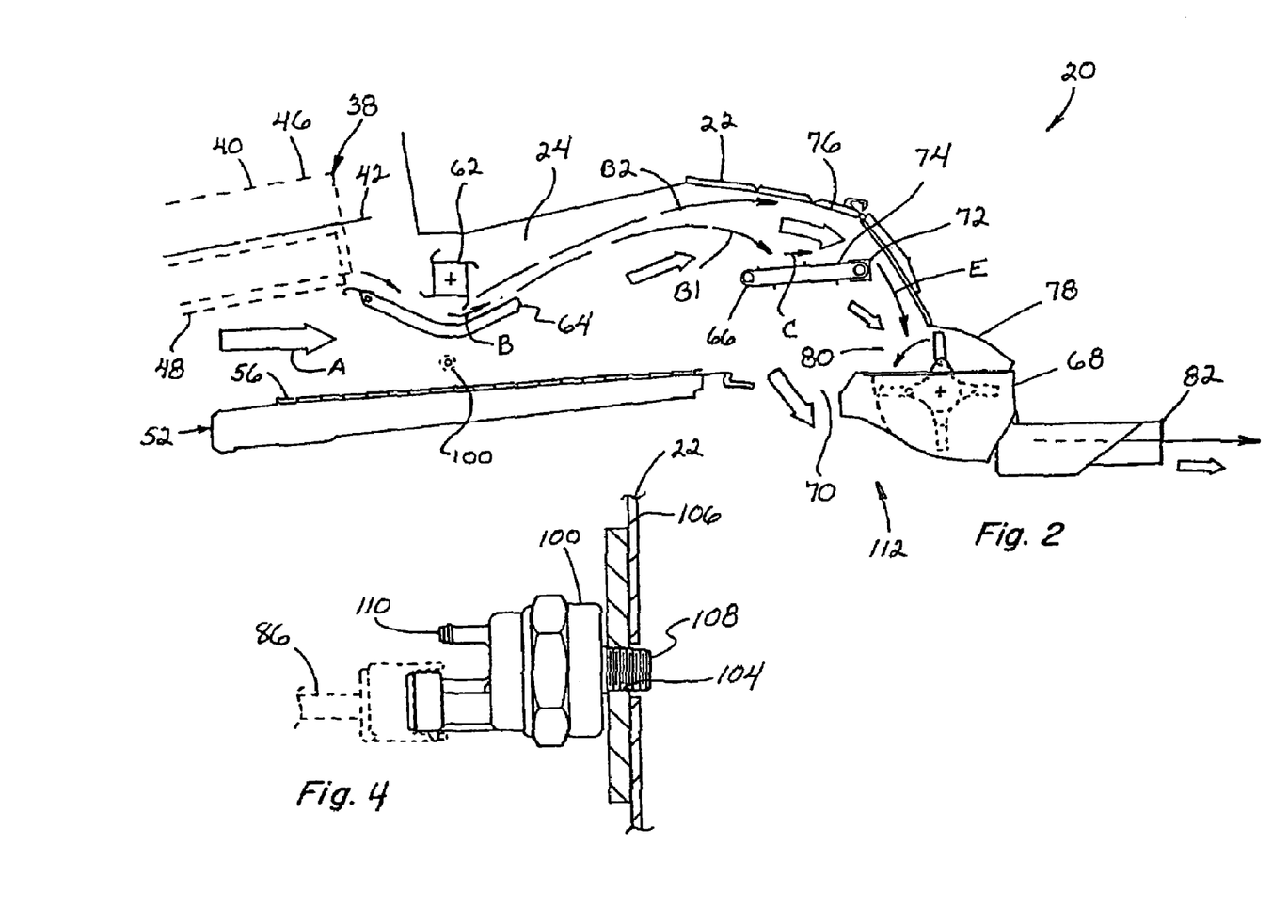
FIG. 2 is a simplified schematic representation of a separating system and a cleaning system of the combine in association with the system of the invention, showing flows in relation thereto.
FIG. 4 is a fragmentary sectional view of a side sheet of the combine and an air pressure sensor of the invention mounted therethrough.

Referring to the drawings, FIGS. 1 and 2 show a self-propelled rotary combine 20 that includes a housing or body 22 defining an internal open area or space 24. While a conventional rotary combine is shown, it is anticipated that the present invention could be used with any type of combine, such as a conventional combine having a threshing cylinder and separation beaters (not shown) or a hybrid combine having a threshing cylinder and rotors (not shown). However, for ease of explanation, the present invention will be discussed hereinafter in conjunction with a self-propelled rotary combine 20 as illustrated by FIGS. 1 and 2.

The body 22 of the combine 20, which can include a supporting frame 26, is supported on front drive wheels 28 and steerable rear wheels 30. The combine 20 is powered by an engine (not shown) and controlled from an operator's station 32.

A crop harvesting apparatus, otherwise referred to as a header 34, and an infeed mechanism 36 are attached at a forward end of the combine 20. The infeed mechanism 36 feeds crop materials to a separating system 38 enclosed within the body. One example of a rotary combine configured with a rotary assembly is disclosed in U.S. Pat. No. 5,489,239, titled "Rotary Combine" and which issued Feb. 6, 1996 to Case Corporation, and which is hereby incorporated herein by reference.

As best shown in FIG. 2, the separating system 38 is preferably configured as a single axial unit that threshes and separates crop materials presented thereto into grain and other materials. However, it should be appreciated that the rotary combine 20 could be configured with more than one separating system 38, for example, with two units arranged in a parallel configuration. The separating system 38 is mounted in the internal space 24 defined by body 22.

The separating system 38 includes a rotor 40 with a longitudinal extent rotatably mounted to the body 22 about a longitudinal axis of rotation 42. It should be understood that the term "longitudinal" means of or relating to length or the lengthwise dimension. It should also be understood that the rotor 40, with its longitudinal extent, could be mounted within the body 22 so as to extend laterally from side-to-side within the combine 20.

It should be understood that the terms "left side," "right side," "left," "right," "front," "rear," "upper," "lower," "top," and "bottom," and their derivatives, as used herein, are intended to indicate directions relative to the views presented in the Figs., and in particular, when viewing the rotary combine 22 of FIG. 1, and the internal components thereof.

Between the upstream, or front end 44, and the downstream, or rear end 46, of separating system 38, the crop material is threshed as it spirals around rotor 40 against a concave 48 disposed at least partially, circumferentially around rotor 40. The rotor 40 can be dimensioned with a broad range of diameters, depending on the desired size and performance characteristics of the combine 20.

Concave 48 has a plurality of apertures that allow the grain to be separated from the other crop material as the grain passes through the apertures. Most of the grain drops onto a grain pan 50. The grain is thereafter conveyed rearward from the grain pan by an auger or other suitable mechanism (not shown) for subsequent cleaning and collection by a cleaning system 52.

The cleaning system 52 cleans chaff, crop residue, tailings and other foreign material from the grain. Cleaning system 52 includes a cleaning fan 54, a chaffer sieve 56, a grain sieve 58, and a clean grain collector therebelow (not shown). A suitable auger mechanism (also not shown) can direct clean grain from the clean grain collector into a hopper or grain bin 60. The cleaning fan 54 directs a flow of air, denoted by large arrow A, upward and rearwardly through sieves 56 and 58, and rearwardly, for blowing the chaff and other particles from the grain.

Crop residue and other waste crop material are impelled rearwardly out of rear end 46 of separating system 38 by a rotary beater 62 which rotates, as denoted by arrow B to "throw" or propel, as denoted by arrows B1 and B2, an airborne flow of crop residue and other waste material, particularly straw, through the space 24 rearwardly toward the rear end of the space 24 and the combine 20. The beater 62 is preferably positioned above a beater pan or concave 64 to facilitate this function. Such airborne flow of the crop residue will typically comprise elements of varying size, mass and other characteristics that will influence the distance that the elements of the crop residue will be thrown or propelled through the space 24, and also the propensity for plugging. For instance, it can be expected that a wad or wads of weeds, vines or tough or green crop residue propelled rearwardly by beater 62 will not travel as far through space 24 compared to lighter individual elements of the crop residue such as individual straws and the like. This can be due to the larger size of the wad, and also greater weight compared to the lighter elements. As a result, it has been found that such wads and larger and/or heavier elements of the crop residue can have a tendency to fall down at more forward locations within the space 24. Moisture conditions such as humidity and moisture content of the crop residue can also be a factor in propensity toward plugging.

To overcome the problem of short falling crop residue, and also plugging, combine 20 further preferably includes an optional conveying mechanism 66. Conveying mechanism 66 is preferably mounted to the body of the combine 20 in a position such as that shown, in spanning relation to a portion of space 24 just below, or in a lower region of, a path of the rearward flow generated by beater 62, denoted by the arrows B1 and B2. Advantageously, conveying mechanism 66 will be positioned in the path of elements of the crop residue flow B, B1 and B2 that would fall short of a desired destination therefor, such as a rearwardly located chopper 68 or an outlet opening, and so as to prevent or limit occurrences of problems including blocking and interfering with the operation of other systems. At the position shown, the front end of the conveying mechanism 66 is located above at least a rear end of a lower rear opening 70, which coincides with a location of most anticipated short falls of crop residue flow B, B1 and B2.

The conveying mechanism 66 can be optionally mounted for pivotal movement in an upward and downward direction, for operation in an alternative position, desired or required for a particular application.

The conveying mechanism 66 includes a conveyor drive 72, which can be, for instance, a well known, commercially available hydraulic motor, an electric motor, etc., drivingly rotatable for continuously moving an upwardly facing conveyor surface 74 of conveying mechanism 66 in the rearward direction, as denoted by arrow C. Conveyor surface 74 is preferably a surface of an endless belt, chain or the like which encircles rollers at the opposite ends of conveying mechanism 66, and can have a generally smooth surface, or a textured surface, or include raised elements thereon, as desired or required for a particular application. The conveyor drive 72 is shown connected in driving relation to one of the rollers for moving conveyor surface 74 in the well known manner.

The conveying mechanism 66 can additionally be optionally rotatable by drive 72 at variable speeds, either under manual control, or automatically responsive to and in adjustment for different characteristics of the crop residue being received and/or other conditions, as represented by one or more predetermined parameters. This can include an indication of an onset of a plugging condition involving mechanism 66. Generally, the conveying mechanism 66 is bounded on its upper side by a crop residue hood ceiling 76, which prevents crop residue from escaping upward. The conveying mechanism 66 cooperates with crop residue hood ceiling 76 for merging portions of, shaping, and regulating crop residue flow B, B1 and B2, as will also be explained. Hood ceiling 76 can also be opened, for configuring to allow outflow of crop residue for windrowing.

Located generally below the conveying mechanism 66 can be other optional crop residue processing mechanisms. For example, crop residue chopper 68. It is contemplated that the chopper 68 can be any conventional chopper currently known in the art or any improved version thereof, for chopping and/or spreading crop residue. Regardless, it is preferred that the chopper 68 include a chopper housing 78 having an inlet opening 80 for receipt of crop residue, such as straw. Located rearward of the chopper 68 is preferably a chopper spreader band or guide 82, for directing the crop residue discharged from chopper 68 in a desired manner over a field, and when windrowing, for guiding crop residue ejected from open hood ceiling onto a field therebelow.

FIG. 2 shows the conveying mechanism 66 mounted adjacent to and in spaced relation below, the crop residue hood ceiling 76 of the combine. As illustrated, it is contemplated that the discharge beater 62 will throw or propel a flow of crop residue rearwardly, denoted by arrows B1 and B2, such that some or all of the crop residue, particularly larger elements and wads thereof, represented by arrow B1, will fall or land upon the conveying mechanism 66, and more particularly, on conveyor surface 74, which is moving rearwardly as denoted by arrow C. The moving surface 74 will carry the crop residue deposited thereon rearwardly so as to effectively be merged or mixed with the still airborne crop residue flow B2, which is at the same time being guided downwardly by the hood ceiling 76, so as to reduce the overall vertical extent of the crop residue flows B1 and B2, so as to be more uniform and consistent. The rearward powered movement of surface 74 of conveying mechanism 66 thus facilitates the collection and consolidation or funneling of the crop residue discharge, and positively delivers it, to the chopper 68, as denoted by arrow E. In this regard, it should be appreciated that elements of the crop residue flow B1 that fall onto conveyor surface 74 will often have little or no useful remaining rearward velocity or momentum, and thus will be accelerated and positively propelled rearwardly to the rear end of the conveyor surface 74 and be combined with flow B2. The rearward movement of and energy imparted to the thus conveyed crop residue of flow B1 will facilitate the merging and mixing thereof with the still airborne portions of the crop residue flow B2, and also the smooth feeding of the combined and merged crop residue flow E into the chopper 68. In this latter regard, the reduced or controlled vertical extent of the combined crop flows B1 and B2 facilitate more uniform, controlled and concentrated entry and feeding of the crop flow E at a desired angle and location into inlet opening 80 of the chopper 68. And, in the event of receipt of a particularly large volume or wad of crop material, the combination of the powered conveying mechanism 66 positively driving the crop material rearwardly and the reducing of the vertical extent thereof will have the effect of throttling and funneling the crop material into the chopper 68 so as to regulate the flow of the crop material inducted therein and reduce the occurrence of induction of wads and large volumes that can overload the chopper and cause problem such as excessive drive belt slippage and resultant wear.

Here, it should be noted that the conveyor surface 74 of the conveying mechanism 66 can additionally be optionally automatically moved in a different opposite direction D by drive 72, and at variable speeds, either under manual control using a suitable input device in operator's station 32 or elsewhere, or automatically, responsive to and in adjustment for different characteristics of the crop residue being received and/or other conditions, as represented by one or more predetermined parameters. Such parameters can include, for instance, but are not limited to, parameters sensed or determined by an element or elements of the header 34, the infeed mechanism 36, the separating system 38, and/or the cleaning system 52, and/or sensors associated with the conveying mechanism 66, such as a load sensor (not shown) associated with surface 74 for sensing a load thereon, or a contact switch (not shown) disposed above the surface 74 which will make or break an electrical circuit responsive to contact with a mass of crop residue or straw being conveyed by the surface 74 or being fed into one of the processing devices such as the chopper 68, or rearwardly from the combine. The speed can be controlled by a processor based control, such as a control 84 (FIG. 3), which can be connected to the drive 72 by a suitable conductive path, such as wire 86 shown. By such control the conveyor surface 74 can be sped up or slowed down, as required or desired to regulate crop residue flow into the chopper 68 for optimizing output therefrom and for regulating the characteristics, such as consistency, cohesiveness and the like, of a windrow (not shown).

Figure 3:
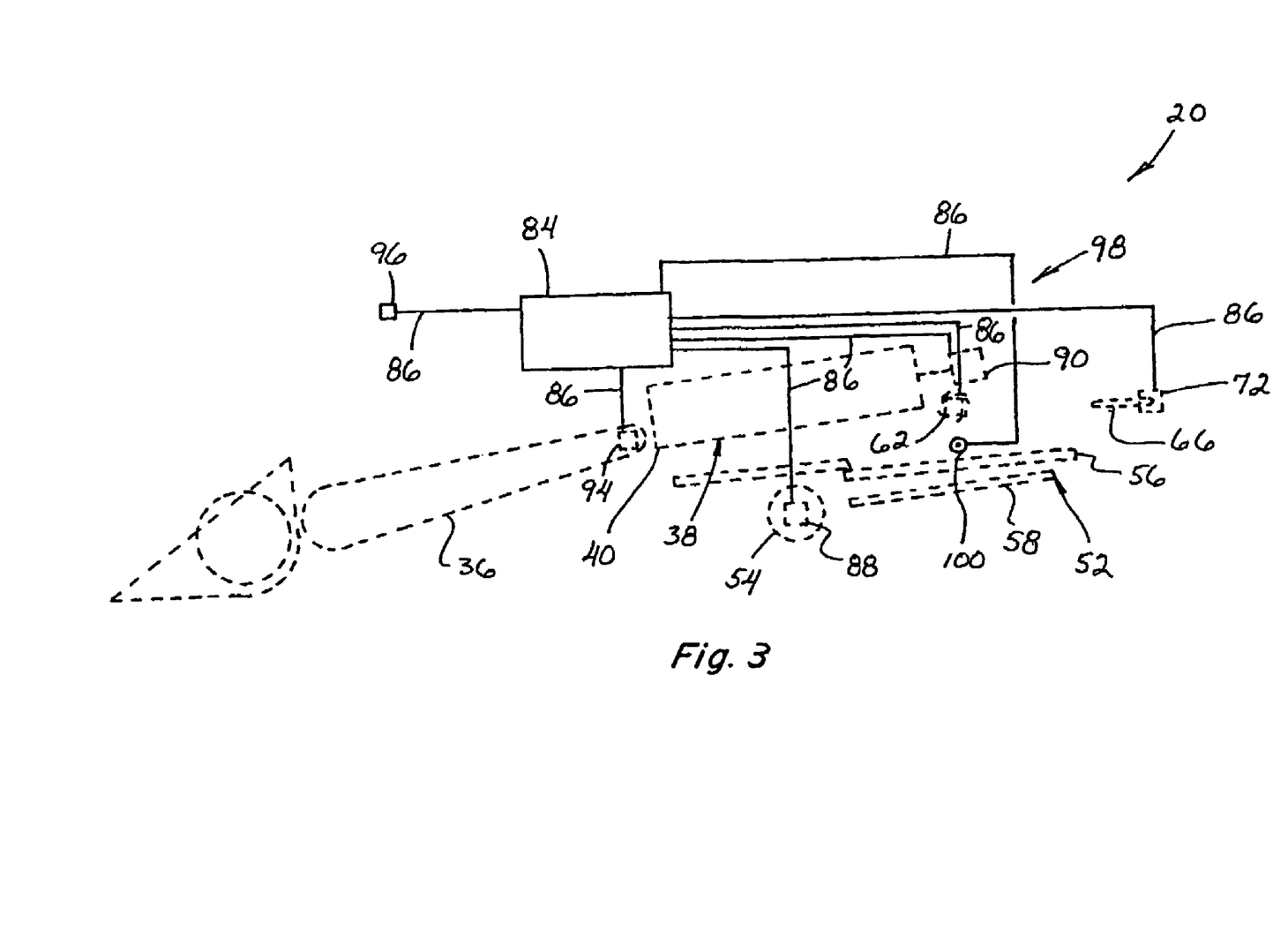
FIG. 3 is simplified schematic representation of aspects of a system of the invention.

Referring also to FIG. 3, a schematic representation of a preferred processor based control 84 for combine 20, is shown. More particularly, control 84 is connected by a connective path 86 to a cleaning fan drive 88 controllably operable for rotating cleaning fan 54 at a desired or required speed determinable by drive 88. Control 84 is also connected to a rotor drive 90 by a conductive path 86, drive 90 being controllably operable for drivingly rotating rotor 40 of separating system 38 and determining a speed thereof. Control 84 is connected by a conductive path 86 to a beater drive 92 controllably operable for rotating beater 62 and determining a rotational speed thereof. Similarly, control 84 is connected by a conductive path 86 to a feeder drive 94 of infeed mechanism 36 for controlling and determining an operating speed thereof. An output device 96 is connected by conductive path 86 to control 84, and is operable for displaying and/or signaling conditions as determined by control 84.

Control 84, and the various aspects thereof, just discussed, importantly comprise elements of a system 98 for detecting a condition indicative of onset of or actual plugging of a discharge path for crop residue from combine 20, constructed and operable according to the teachings of the present invention. System 98, importantly, includes a sensor 100 disposed in space 24 so as to be operable for sensing a condition therein which is indicative of a reduced crop residue flow condition toward the rear end of space 24, which reduced crop residue flow condition can include, but is not limited to, a partial or complete plugging or blocking of the rear region of space 24 between conveying mechanism 66 and hood ceiling 76, as illustrated by crop residue plug 102 between conveying mechanism 66 and hood ceiling 76 in FIG. 5.

Figure 5:
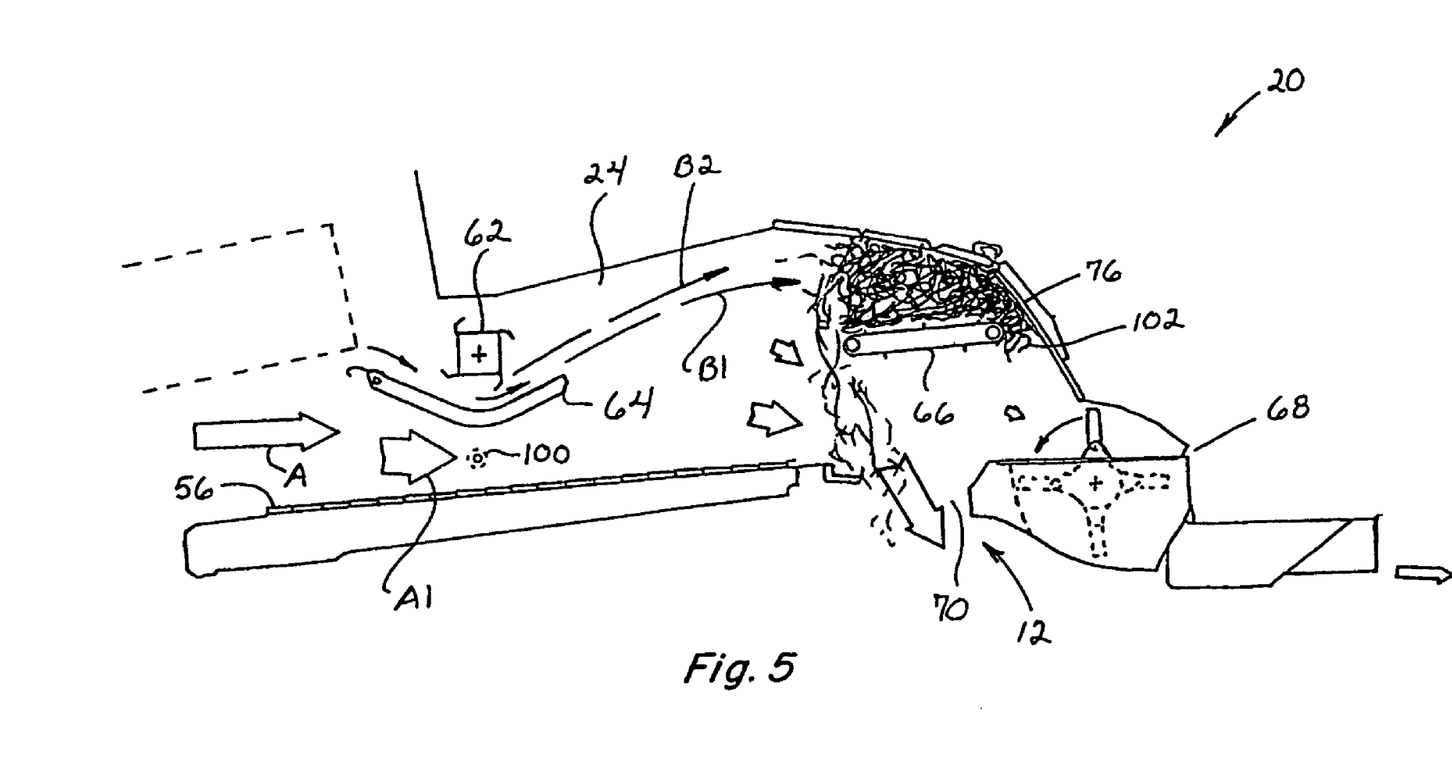
FIG. 5 is another simplified schematic representation of the separating system and the cleaning system of the combine in association with the system of the invention, showing plugging in a discharge region and resultant changes in flows through the combine.

Referring also to FIGS. 4 and 5, sensor 100 is preferably an air pressure sensor which can be, for instance, a commercially available differential pressure transducer available from Kavlico, of Moorpark, Calif. USA, operable for sensing and detecting changes and variances in air pressure. Sensor 100 is preferably a model threadedly mountable in a hole 104 in a side wall or sheet 106 of body 22 of combine 20. Sensor 100 is preferably of at least generally well known construction including a port 108 in connection with space 24, and another port 110 in connection with another location, such as ambient conditions on the exterior of combine 20, and is operable for sensing and detecting differences in pressure in respective ports 108 and 110, and outputting a signal representative thereof over a suitable conductive path, such as a wire 86 in connection with control 84, as illustrated in FIG. 3. It is desirable for sensor 100 to be operable for detecting conditions, particularly air pressure conditions, and more particularly, static air pressure conditions, in a region of space 24 of combine 20 which will be indicative of the onset of, or actual, plugging of all, or a portion of, a discharge of combine 20, generally denoted by region 112 in FIGS. 2 and 5. More particularly, discharge 112 can include, the region between conveying mechanism 66 and hood ceiling 76, the inlet opening 80 of chopper 68, and/or lower rear opening 70, as well as any other aspect of combine 20 involving discharge of crop residue therefrom involving outflows of crop material from separating system 38 and/or cleaning system 52.

As a preferred location for sensor 100, it has been found that pressure conditions of air flow A generated by cleaning fan 54 and directed through and over chaffer sieve 56 toward the rear end of space 24 will be increased by the onset of, and actual, plugging of one or more regions of discharge 12, such as, but not limited to, the region between conveying mechanism 66 and hood 76, as illustrated by plug 102 in FIG. 5, even though such plug 102 is located virtually at the opposite end of space 24 within the combine. It has been further found that in the region of space 24 between chaffer sieve 56 and concave 64, static air pressure conditions can be sensed which will be indicative of conditions elsewhere in space 24, particularly in discharge 112, and it has been concluded that sensing of such air flow conditions at such location, as illustrated by the location of sensor 100 in FIGS. 2 and 5, is highly advantageous for monitoring operating conditions in discharge 112. As another advantage, the region of space 24 between concave 64 and chaffer sieve 56 is much less subject to blockage or plugging, such that reliability of operation is enhanced. As an example, referring more particularly to FIG. 5, a plug 102 can virtually fill the space between conveying mechanism 66 and hood ceiling 76, without resulting in any plugging or significant buildup of crop material in the vicinity of sensor 100 when located as shown. However, it has been found that the existence of a plug such as plug 102 which partially or completely blocks the pathways for discharge of air from space 24, will result in an increase in static air pressure in the vicinity of sensor 100, as illustrated by large arrow A1. This increase in pressure will be detected by sensor 100 and information relating thereto outputted by sensor 100 to control 84 of system 98 (FIG. 3). Control 84, in turn, is operable, for instance, to compare the information to stored values corresponding to other parameters, such as a speed of cleaning fan 54, to determine the existence of a plug, such as plug 102, or the onset of the formation thereof. An advantage of utilizing sensed air pressure in the above-described manner, is that the pressure can be incrementally determined, and, for instance, an upward trend detected, which may be determined to be indicative of the onset of a plugging condition. Other parameters or conditions can also be factored, including, but not limited to, load on and/or speed of conveying mechanism 66; speed of beater 62; speed of rotor 40; and/or speed of infeed mechanism 36. Once the existence of the onset of, or an actual plugging condition, is determined, control 84 can be programmed to output a signal representative thereof, for instance, to output device 96, and/or control 84 can automatically adjust one or more operating parameters, such as, but not limited to, any or all of the speeds of infeed mechanism 36, separating system 38, beater 62, conveying mechanism 66, and/or chopper 68, for mitigating or clearing the condition, or allowing its removal. Comparing air flow patterns (large white arrows) in discharge 112 of combine 20 in FIGS. 2 and 5, representative of a clear condition, and a plugged condition, respectively, it can be seen that a plug such as plug 102 in FIG. 5 will cause a diversion of normal air flow patterns, as well as at least some crop residue flow from flows B1 and 2, downwardly toward and through lower rear opening 70, thereby creating an increased pressure condition A1 in the region of sensor 100. Essentially, this can be summarized as a back pressure condition created as a result of limiting out flow paths for air through discharge 112. Control 84 can be programmed to differentiate between ranges of pressures sensed under conditions represented by FIGS. 2 and 5, respectively, for determining existence of a plugging condition (FIG. 5), and also the onset of such a condition. Responsively, control 84 can output an appropriate signal to output device 96 to alert an operator who, in turn, can responsively take an appropriate action, such as, but not limited to, halting operation of combine 20 and manually clearing the plug, altering an operating condition of conveying mechanism 66, such as increasing a speed thereof, or reversing a direction of rotation thereof, or generally slowing the operation of one or more systems of the combine. Here, it should be noted that FIGS. 2 and 5 illustrate discharge 112 configured in a chopping mode, for delivering crop residue to chopper 68, and that a set or sets of pressure values can be stored and referred to by control 84 for determining onset or existence of a plugging condition in that configuration. Other sets of pressure condition information can be stored when discharge 112 is configured differently, for instance, for discharging crop residue through lower rear opening 70 without chopping, or by opening hood ceiling 76 for conveying crop residue from the rear of combine 20 in a windrow.

Figure 6:
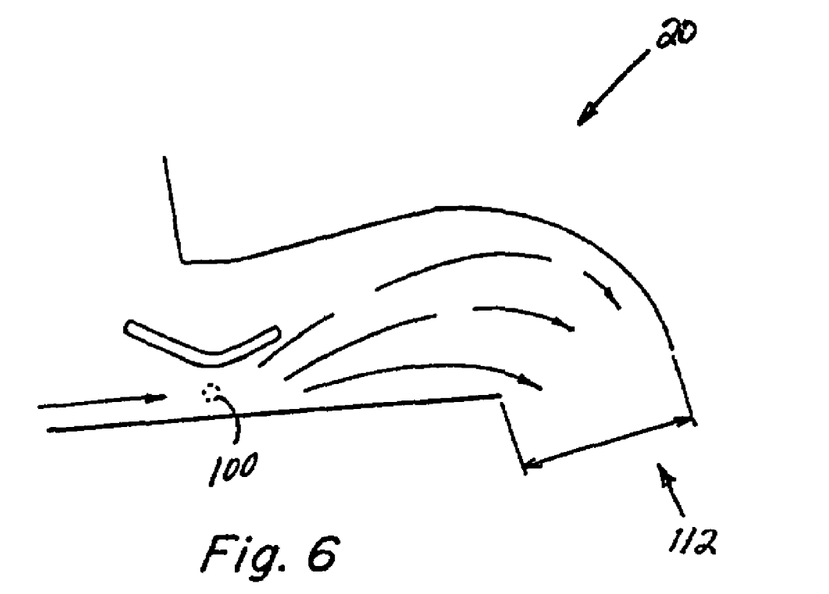
FIG. 6 is a simplified schematic illustration of open flow through the combine.
Figure 7:
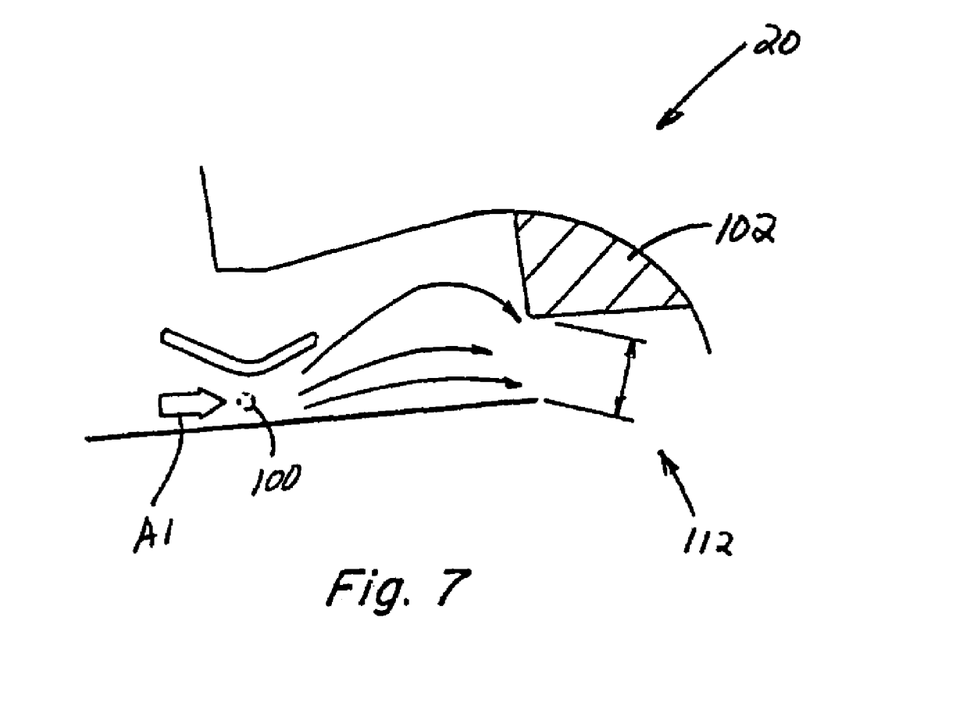
FIG. 7 is another simplified schematic illustration of plugged flow through the combine.

Referring also to FIGS. 6 and 7, schematic illustrations of the rear end of combine 20 when unobstructed (FIG. 6) and when plug, such as by a plug 102 (FIG. 7) are illustrated. Here, it is evident that the extent of an area for escape of air through discharge 112 is smaller as a result of the presence of plug 102, so as to result in the increased pressure condition A1 (FIG. 7) which is detected by sensor 100 of the present invention.

Although an exemplary embodiment of the system and method for detecting onset or actual plugging conditions in a discharge of a combine has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A method of operation of an agricultural combine comprising the steps of:
   Providing a body defining a space containing a separating system, and a rear opening spaced rearwardly of the separating system;
   Providing a propeller disposed in the space between the separating system and the rear opening and operable for propelling a flow of crop residue rearwardly along a crop flow path from the separating system;
   Providing a cleaning system disposed in the space below the propeller and including a fan disposed for directing a flow of air rearwardly through an air flow channel between the cleaning system and the propeller;
   Providing an air pressure sensor disposed in the space;
   Providing a crop residue chopper disposed in connection with the rear opening, and a conveyor mechanism in a rear region of the space in a position for receiving at least a portion of the flow of the crop residue from the propeller and conveying the received flow into the chopper; and
   Providing a control in connection with the air pressure sensor and a device for determining a speed of the conveyor mechanism;
   Operating the air pressure sensor for sensing an air pressure condition indicative of plugging of the conveyor mechanism; and
   Operating the control as a function at least in part of a sensed air pressure and determined speed of the conveyor mechanism in order to adjust the speed of at least one of the fan and the conveyor mechanism responsive thereto.

* * * * *